(12) United States Patent
Cordeiro et al.

(10) Patent No.: US 7,756,058 B2
(45) Date of Patent: Jul. 13, 2010

(54) SPECTRUM MEASUREMENT MANAGEMENT FOR DYNAMIC SPECTRUM ACCESS WIRELESS SYSTEMS

(75) Inventors: Carlos Cordeiro, Portland, OR (US); Kiran Challapali, New City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 173 days.

(21) Appl. No.: 12/066,851

(22) PCT Filed: Sep. 14, 2006

(86) PCT No.: PCT/IB2006/053286
§ 371 (c)(1), (2), (4) Date: Mar. 14, 2008

(87) PCT Pub. No.: WO2007/031956
PCT Pub. Date: Mar. 22, 2007

(65) Prior Publication Data
US 2008/0259811 A1    Oct. 23, 2008

Related U.S. Application Data

(60) Provisional application No. 60/718,127, filed on Sep. 16, 2005.

(51) Int. Cl.
H04L 12/26 (2006.01)
H04Q 7/24 (2006.01)
H04J 3/00 (2006.01)

(52) U.S. Cl. .................. 370/252; 370/338; 370/337

(58) Field of Classification Search ................. 370/252, 370/338, 337, 347
See application file for complete search history.

(56) References Cited

U.S. PATENT DOCUMENTS

| | | | |
|---|---|---|---|
| 2004/0248568 A1 | 12/2004 | Lucidarme | |
| 2005/0009565 A1* | 1/2005 | Kwak | 455/561 |
| 2006/0018284 A1* | 1/2006 | Rudolf et al. | 370/332 |
| 2006/0200862 A1* | 9/2006 | Olson et al. | 726/23 |
| 2007/0002757 A1* | 1/2007 | Soomro et al. | 370/252 |
| 2007/0060067 A1* | 3/2007 | Ruuska | 455/67.11 |
| 2007/0286143 A1* | 12/2007 | Olson et al. | 370/338 |
| 2008/0280621 A1* | 11/2008 | Soomro et al. | 455/450 |
| 2008/0293410 A1* | 11/2008 | Chan et al. | 455/434 |
| 2009/0149135 A1* | 6/2009 | Mangold et al. | 455/77 |

FOREIGN PATENT DOCUMENTS

EP   1473956 A2   11/2004

OTHER PUBLICATIONS

Internet Citation, "Functional Requirements for the 802.22 WRAN Standard", Aug. 2005, XP002425031 URL:www.ieee802.org/22/Meeting_documents/2005_Aug_teleconferences/22-05-007-39-0000_RAN_Requirements.doc.

\* cited by examiner

Primary Examiner—Andrew Lee
(74) Attorney, Agent, or Firm—Larry Liberchuk

(57) ABSTRACT

A wireless system (100) and method (401-403) includes a medium access control (MAC) layer adapted to request and receive measurement reports from wireless devices (102) operating in restricted channels.

15 Claims, 3 Drawing Sheets

SPECTRUM MEASUREMENT MANAGEMENT FOR DYNAMIC SPECTRUM ACCESS WIRELESS SYSTEMS

CROSS-REFERENCE TO RELATED APPLICATIONS

The present application claims priority from under 37 C.F.R. §1.119(e) from U.S. Provisional Patent Application Ser. No. 60/718,127, filed on Sep. 16, 2005. The disclosure of this application is specifically incorporated herein by reference.

Wireless communication technology has significantly advanced making the wireless medium a viable alternative to wired solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few).

As wireless applications continue to grow, so do the numbers of devices, networks and systems vying for the communications spectrum. As is known, there are dedicated or licensed portions as well as unlicensed portions of the communications spectrum. Because the unlicensed bands of the spectrum (e.g., the industrial, scientific and medical (ISM) radio bands) may be accessed freely, these bands tend to be heavily populated by users. Contrastingly, recent studies indicate that only a small portion of the licensed band is being used. Thus, much of the unlicensed band is overcrowded, while a relatively large portion of the licensed band remains unused. This had lead regulatory bodies (e.g., the Federal Communications Commission (FCC) of the U.S.) to an evaluation of current communication band allocations and their use.

One option for reallocation of the communications band involves the use of wireless networks adapted to dynamically access the communications spectrum. For example, dynamic spectrum access (DSA) wireless networks may be implemented in dedicated (licensed) portions of the communications spectrum. Illustratively, DSA wireless networks may operate in a spectrum normally dedicated for television transmission and reception. Thereby, certain portions of the communications band may be more fully utilized.

With the reallocation of certain communication bands for use by unlicensed (secondary) users, spectrum management is needed to ensure that licensed (primary or incumbent) users with priority access to the band are provided this access in an unfettered manner. For example, regulatory bodies (e.g., the FCC) may require that a secondary user vacate a channel in a relatively short period of time after an incumbent user begins occupation of the channel. Therefore, the medium access control (MAC) layer and physical (PHY) layer specifications must include provisions directed to this needed spectrum management.

The MAC layer of a DSA wireless network addresses the time varying occupancy of restricted channels/bands. To this end, the MAC layer not only must coordinate the vacating of a restricted channel/band when an incumbent device begins to occupy the channel/band, but also must coordinate the switching of the secondary devices to available restricted channels/bands or the terminating the secondary service if no channels are available. The former function is useful to ensure compliance with regulatory specifications; and the latter is useful in providing a suitable level of the quality of service (QoS) for the secondary devices. In order to comply with the regulatory specifications and to ensure a suitable QoS, measurements must be made to determine if occupation of a channel(s) is imminent or immediate.

What is needed, therefore, is a method of assigning measurements to be made and reporting of the measurements in DSA wireless networks that function in restricted frequency channels and frequency bands.

In accordance with a representative embodiment, in a wireless communication network, a method of wireless communication includes transmitting a measurement request to one or more wireless stations (STAs) in the network. The method also includes performing the measurements according to the measurement request; and reporting results of the measurements.

In accordance with another representative embodiment a wireless communication network includes an access point (AP) adapted to transmit a measurement request to one or more wireless stations (STAs) in the network. The STAs are adapted to perform measurements according to the measurement request, and to report results of the measurements.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
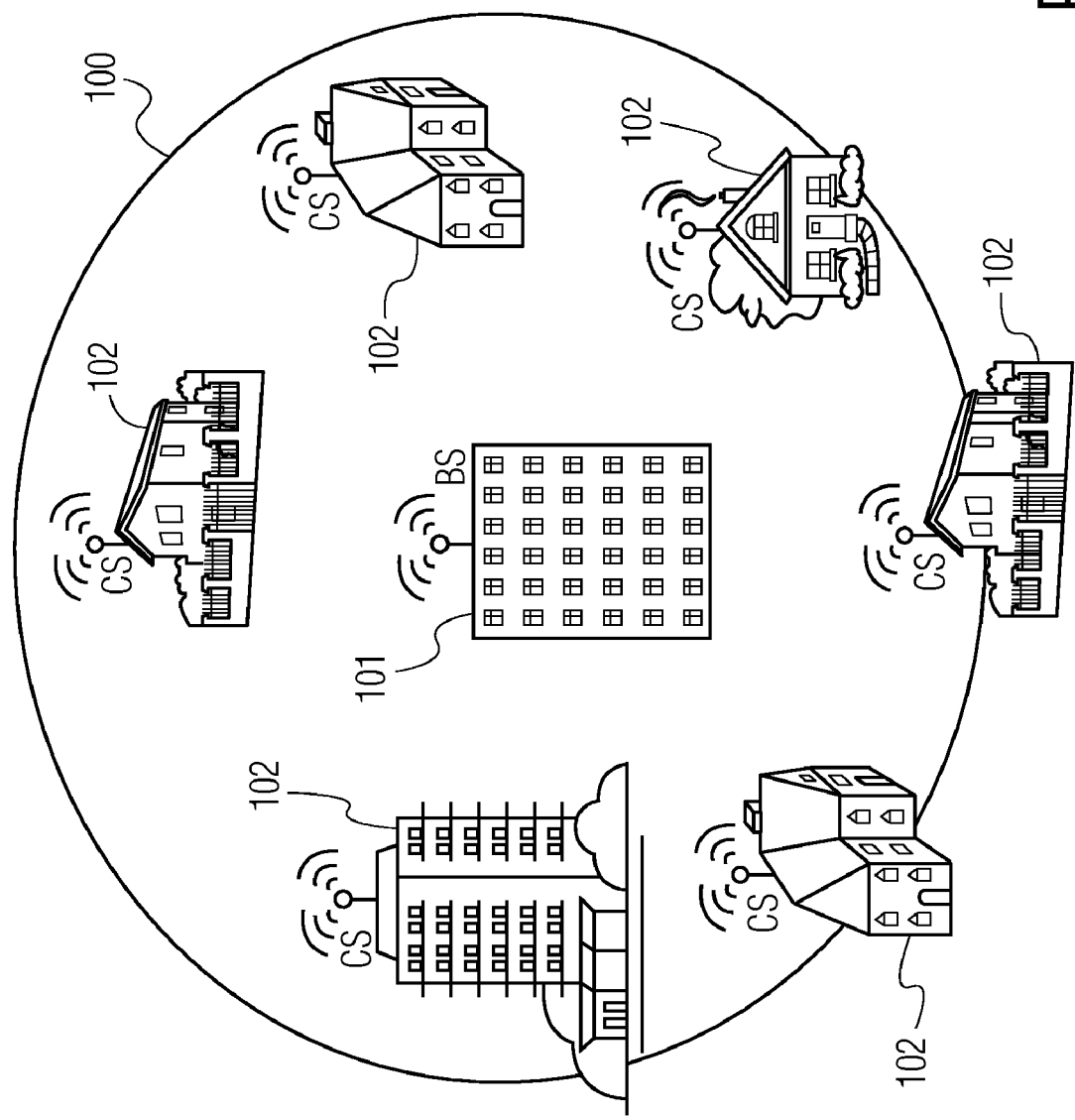
FIG. 1 is a simplified schematic diagram of a wireless communication system in accordance with an example embodiment.

As used herein the term 'restricted frequency channel' or 'restricted channel' means a frequency channel dedicated for use by primary users. The restricted channels may be portions of the communications spectrum that is licensed by a regulatory body such as the FCC, or that are accessed on a priority basis by certain users. For example, the television channels in the United States are licensed frequency channels. However, certain device such as wireless microphones may access the network with priority over other users, even though the wireless microphones are not expressly licensed for use of the television spectrum. Thus, certain unlicensed channels that are restricted channels are contemplated as restricted channels. In addition, so-called licensed-exempt channels, which provide priority access to certain users, are also restricted channels.

As used herein, the terms 'a' and 'an' mean one or more; and the term 'plurality' means two or more.

In the following detailed description, for purposes of explanation and not limitation, example embodiments disclosing specific details are set forth in order to provide a thorough understanding of the present teachings. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the example embodiments. Nonetheless, such devices, methods, systems and protocols that are within the purview of one of ordinary skill in the art may be used in accordance with the example embodiments. Finally, wherever practical, like reference numerals refer to like features.

It is noted that in the illustrative embodiments described herein, the network may be a wireless network with a centralized architecture or a decentralized architecture. Illustratively, the network may be one which functions under a DSA Medium Access (MAC) layer, such as to be defined under IEEE 802.22, or as defined under IEEE 802.16, IEEE 802.11, IEEE 802.15, as well as many other standards that requires spectrum measurements to be undertaken. The measurement messages described herein may thus be implemented in the MAC layer defined under these standards. Moreover, the network may be a cellular network; a wireless local area network (WLAN); a wireless personal area network (WPAN); or a wireless regional area network (WRAN). Furthermore, the MAC protocol may be a time division multiple access (TDMA) protocol; a carrier sense multiple access (CSMA) protocol; a CSMA with collision avoidance (CSMA/CA) protocol; a Code Division Multiple Access (CDMA) protocol; or a frequency division multiple access (FDMA) protocol. It is emphasized that the noted networks and protocols are merely illustrative and that networks and protocols other than those specifically mentioned may be used without departing from the present teachings.

FIG. 1 is a simplified schematic view of a wireless network 100 in accordance with an illustrative embodiment. In a specific embodiment, the wireless network 100 is a centralized network. However, the present teachings may be generalized to a distributed wireless network.

The wireless network 100 includes an access point (AP) 101, which is also referred to as a base station (BS). The wireless network 100 further comprises a plurality of wireless stations (STAs) 102, which also may be referred to as wireless devices or as Customer Premise Equipment (CPE). The STAs 102 are disposed in the buildings shown in FIG. 1. In representative embodiments, the STAs 102 may be computers, mobile telephones, personal digital assistants (PDA), or similar device that typically operates in such networks.

Illustratively, the wireless network 100 may be one of the types of networks noted previously. It is contemplated that the STAs 102 are adapted to function in restricted frequency channels of a frequency band that requires protection of incumbent users. As such, the BS 101 and the STAs 102 are secondary devices and the network 100 is a secondary network. Often, for simplicity restricted frequency channels and restricted channels may be referred to as 'channels.'

It is noted that only a few STAs 102 are shown; this is merely for simplicity of discussion. Clearly, many other STAs 102 may be used. Finally, it is noted that the STAs 102 are not necessarily the same. In fact, a plethora of different types of STAs adapted to function under the chosen protocol may be used within the network 100.

The DSA MAC layer methods and apparati of the example embodiments may be implemented in dynamic environments where the availability and quality of channels vary over time (e.g., new wireless technologies designed for the TV bands). Thus, the network of secondary STAs of the example embodiments beneficially obtain channel availability in a dynamic manner; and beneficially notify other secondary STAs of the occupation or future occupation of a channel by an incumbent device. As described in detail herein, the DSA MAC layer methods and apparati of the illustrative embodiments provide channel access instructions to the secondary STAs 102. Beneficially, the channel access instructions foster unfettered use of restricted channels/bands by the incumbent devices and access to restricted channels/bands by the secondary STAs.

Figure 2:
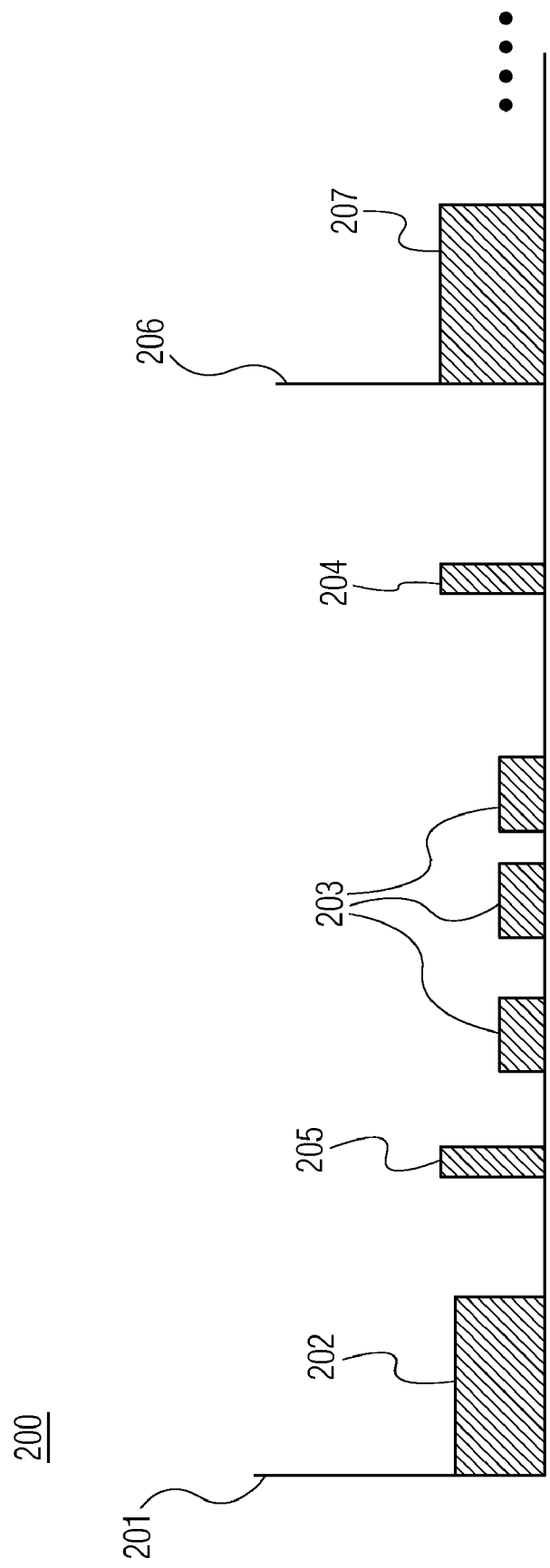
FIG. 2 is a simplified time-line of plurality of superframes in accordance with an illustrative embodiment.

FIG. 2 is a simplified representation of a time line 200 in accordance with an illustrative embodiment. The time line 200 may be that of a distributed (decentralized) wireless network or of a centralized wireless network. The time line 200 shows start times 201, 205 of superframes. At the start time 201 of the first superframe, a beacon period 202 commences. In a centralized system, the BS 101 would broadcast various messages, including those described in greater detail herein. In a distributed systems, during the beacon period, the CPEs (STAs) communicate to ensure certain functions are performed during the ensuing data transmit period (DTP) and, optionally, during subsequent DTPs of later superframes. These functions include measurements described more fully herein.

The beacon period 202 or DTP may also include quiet periods during which the STAs do not transmit. These beacon periods are often used by the BS 101 to conduct certain broadcast transmissions as well as other functions, some of which are described herein. Also, during the quiet periods, the STAs 102 may conduct various measurements to garner data used for spectrum management.

The superframes include zero or more regular measurement reporting period 203. As described more fully herein, the regular measurement reporting period 203 is the dedicated period of time within a superframe that one or more STAs 102 transmit reports of measurements made in a time period since previous reports. In representative embodiments, specific STAs 102 are instructed to provide measurement reports in one or more periods 203.

The superframe may also include an urgent measurement reporting period 204. The urgent measurement reporting period 204 is reserved for the transmission of reports of high priority events. For example, if an incumbent device were to occupy a restricted channel during the current superframe, the STAs 102 would have to retreat to a designated back-up or rendezvous channel in an expeditious manner. Doing so provides the incumbent device with unfettered access to the channel, and maintains the QoS of the network 100 by providing access to other channels for continued communication. Notably, there may be more than one urgent period 204 in a superframe; but it is not necessary for each superframe to include an urgent period 204.

The superframe may include zero or more request to measure periods 205. During this period, the BS 101 may transmit certain packets to the STAs 102 with instructions on the types and quantities of measurements to be made. These periods 205 may include requests addition to or instead of the requests transmitted in the beacon period 201.

As described presently, there are various illustrative requests for measurements, acknowledgements of the requests and reports that can be made in order to properly manage the restricted channels/spectrum. Certain illustrative formats are provided presently. It is emphasized that these formats and applications are merely representative and that other formats and applications may be used in keeping with the present teachings.

I. Requests and Acknowledgements

As noted, there are exchanges between the BS 101 and the STAs 102 in a centralized network, and between STAs 102 in a distributed network. These exchanges include requests for certain measurements and acknowledgements of the requests. One of the requests is a bulk measurement request (BLM-REQ) management message. This message is transmitted by the BS 101 to STAs 102 during the beacon period 201 or the request to measure period 205; and contains instructions. These instructions may include the type of measurements to be performed, when the measurements are to be made, measurement duration, how many times a given measurement has to be repeated, the confidence interval for each measurement, the measurement threshold for the particular measurement type (e.g., −116 dBm/6 MHz to detect a digital television signal), the repetition sequence of the channels, as well as other fields within the purview of one of ordinary skill in the art.

Upon receiving BLM-REQ message, the STA 102 shall examine this message's header and determine whether it is required to respond back with a BLM-RSP message. In all cases, the STA 102 shall carry out all the measurements as requested by the BS 101, if these are supported. Beneficially, the STAs 102 report back to the BS 101 with a BLM-REP message (described below), which contains measurement results of what has been requested by the BS in the corresponding BLM-REQ message. These reports are sent with the periodicity specified by the BS in the corresponding BLM-REQ message or can also be urgent reports, which are described more fully herein. Once the measurement report message is successfully received at the BS, the STA 102 clears its local statistics to prepare for future measurements.

Since the correct receipt of these management messages is important to the correct system behavior, the BS 101 may require CPEs 102 to acknowledge the receipt of BLM-REQ messages. This is done through bulk measurement response (BLM-RSP) messages. A BLM-RSP management message is sent in response to a BLM-REQ and serves to confirm the receipt of the BML-REQ message by the CPE. The need to send a BLM-RSP message is indicated by the BS in the corresponding BLM-REQ message, through the use of the Confirmation Needed field.

An illustrative format for the BLM-REQ and the BLM-RSP are provided in the following tables I, and II and III:

TABLE I

Example of BLM-REQ message format

| Syntax | Size | Notes |
| --- | --- | --- |
| BLM-REQ_Message_Format( ) | | |
| Management Message Type | 8 bits | |
| Transaction ID | 16 bits | Shall be set to a nonzero value chosen by the BS sending the measurement request to identify the request/report transaction. |
| Starting Channel Number | 8 bits | |
| Number of Channels | 8 bits | |
| Confirmation Needed | 1 bit | Indicates whether or not the CPE is required by the BS to confirm, with a BLM-RSP message, the receipt of this message.<br>0 = No confirmation needed (default)<br>1 = Confirmation needed |
| Number of Single Measurement Requests | 3 bits | The number of single measurement requests contained in this message |
| Single Measurement Requests | Variable | Collection of single measurement requests. |

TABLE II

BLM-RSP Message format

| Syntax | Size | Notes |
| --- | --- | --- |
| BLM-RSP_Message_Format( ) { | | |
| Management Message Type | 8 bits | |
| Transaction ID | 16 bits | |
| Confirmation Code | 8 bits | Table III |

TABLE III

Confirmation Code (CC) values

| CC | Status |
| --- | --- |
| 0 | OK/success |
| 1 | reject-other |
| 2 | reject-unrecognized-configuration-setting |
| 3 | reject-temporary/reject-resource |
| 4 | reject-permanent/reject-admin |
| 5 | reject-not-owner |
| 6 | reject-service-flow-not-found |
| 7 | reject-service-flow-exists |
| 8 | reject-required-parameter-not-present |
| 9 | reject-header-suppression |
| 10 | reject-unknown-transaction-id |
| 11 | reject-authentication-failure |
| 12 | reject-add-aborted |
| 13 | reject-exceed-dynamic-service-limit |
| 14 | reject-not-authorized-for-the-request-SAID |
| 15 | reject-fail-to-establish-the-requested-SA |
| 16 | reject-not-supported-parameter |
| 17 | reject-not-supported-parameter-value |

The BLM-REQ messages can be comprised of a multitude of single measurement messages, which are discussed presently. Each of these single measurement requests can be associated with a different type of measurement, and hence provides a high degree of flexibility to the network 100. The single measurement messages may be sent as part of the BLM-REQ, or may be sent on an individual basis. Moreover, the single measurement request may be directed to a particular STA 102 or to a group of STAs 102. The determination of which STAs 102 is to receive a request is governed by factors such as STA location, destination address (es), previous measurement reports and similar factors. These factors are normally outside the scope of the present teachings and are not described more fully in order to avoid obscuring the description of representative embodiments.

In addition to targeting one or more STAs to make measurements, the single measurement request instructs the STA(s) as to particular measurements to make. The measurements to be made are based on needs to monitor certain aspects the primary network to ensure that the incumbent devices are granted unfettered access (within allowed deviation) to the primary network and so that the secondary users can adapt to changes in the network (e.g., accessing a backup channel) in order to maintain a desired QoS. With this understanding, the following measurement fields of Tables IV and V for a single measurement request are noted to be merely illustrative and that other measurements may be made in order to garner the needed measurement data to ensure incumbent access and secondary STA QoS.

In a single BLM-REQ, the BS 101 may simultaneously request STAs 102 to perform several types of measurements in a number of channels. Thus, a BLM-REQ may be formed by a collection of single measurement requests. Each single measurement request specifies several parameters such as the frequency with which the BS 101 requires the STAs 102 to report measurements or if the reports are to be autonomous. Furthermore, single measurement requests also define timing parameters, as illustrated in Table IV and FIG. 3.

Upon receiving BLM-REQ message, the STA 102 shall examine the message header and determine whether it is required to respond back with a BLM-RSP message. In all cases, the STA 102s carry out all the measurements as requested by the BS 101, if these are supported. STAs 102 shall report back to the BS 101 with a BLM-REP message (described below), which contains measurements of what has been requested by the BS in the corresponding BLM-REQ message. These reports shall be sent with the periodicity specified by the BS 101 in the corresponding BLM-REQ message.

Once the measurement report message is successfully received at the BS 101, the STA 102 shall clear its local statistics to prepare for future measurements.

TABLE IV

Single Measurement Request Message Format

| Syntax | Size | Notes |
|---|---|---|
| Single_Measurement_Request_Format( ) | | |
| Element ID | 8 bits | |
| Length | 8 bits | |
| Transaction ID | 16 bits | |
| Number of Repetitions | 16 bits | Contains the requested number of repetitions for the periodic measurement request elements in this frame. A value of zero in the Number of Repetitions field indicates measurement request elements are executed only once. |
| Report Frequency | 8 bits | This field indicates how often a CPE shall report measurements back to the BS 0: This field is not used to request a measurement report. That is, the CPE will report measurements either autonomously or whenever requested by the BS. 1: The CPE shall either report immediately to the BS (if this is in regards to an existing Transaction ID) or will report to the BS at the end of each repetition interval (in the case of a new Transaction ID). Note that in the case of an existing Transaction ID and Report Frequency == 1, the local information maintained by the CPE shall only be updated for this transaction if Number of Repetitions is not zero. 2-127 The CPE shall send a report to the BS at the end of every X number of repetitions. |
| Restart Delay | 16 bits | This field indicates the delay between two measurement repetitions. As shown in Table VI, the Measurement Period is divided into two subfields: Time Scale and Restart Delay. The Time Scale subfield defines the scale for the Restart Delay subfield as shown in Table. The subfield consists of a 15 bit unsigned integer number representing the fixed time delay between the completion of the last periodic measurement until the measurement activity is restarted. |

TABLE IV-continued

Single Measurement Request Message Format

| Syntax | Size | Notes |
|---|---|---|
| Request Mode | 3 bits | Table V |
| Request Element | Variable | Table VIII |
| } | | |

TABLE V

Example of Request Information Elements

| Element ID (1 byte) | Length (bytes) | Description |
|---|---|---|
| 0 | Variable | TV System Related Measurement Request - section |
| 1 | Variable | Wireless Microphone System Related Measurement Request - section |
| 2 | Variable | Beacon (802.22 Related) Measurement Request - section 0 |
| 3 | Variable | Stop Measurement Request - section 0 |
| 4 | Variable | CPE Statistics Measurement Request - section 0 |
| 5 | Variable | Location Configuration Measurement Request - section 0 |
| 6-128 | | Reserved |

As noted, there may be a need to repeat measurements over a period of time. By securing multiple measurements of one or more desired parameters, the data garnered provide a more reliable measure of the parameters, and thereby improve the confidence factor of the measurements. Suppose a particular STA 102 made a signal power measurement of a particular channel while operating as a lone STA on the fringes of the network 100 and detected an incumbent, while all other STAs 102 operated more close to the center of the network 100. Based on these data alone, the BS 101 may send a message to occupy a back-up channel. However, if the STA 102 that provided these measurement data moved closer to the group of STAs 102 and repeated the measurement, there may be little if any signal strength from an incumbent. Another measurement may confirm these data and the BS 101 would then maintain the current operations. As such, repeated measurements can function to provide a more realistic measure of the state of operations.

Figure 3:
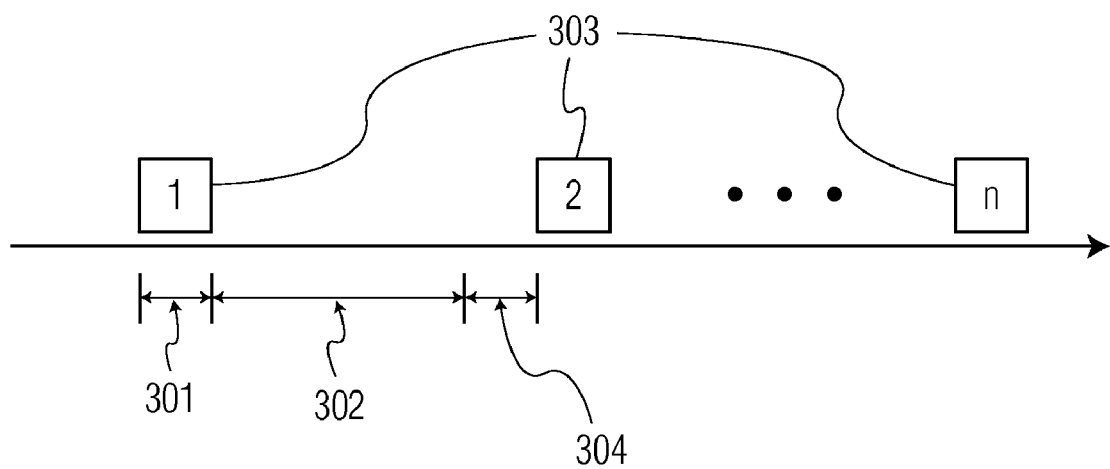
FIG. 3 is a simplified time-line of plurality of superframes in accordance with an illustrative embodiment.

FIG. 3 is a conceptual view of a timing diagram showing repeated measurements and in keeping with the fields of Table IV. Notably, each of the measurements may be made during a designated period of the superframe, during a quiet period, or during a period of inactivity of the STA 102 charged with making the measurements.

The timing diagram shows a duration 301, during which a measurement is taken. In addition, a restart delay 302 is shown. The duration and restart delay are provided in fields in the single measurement request of Table IV. These fields may be formatted according Tables VI and VII.

TABLE VI

Repetition Delay Field

| Bits: 1 | 15 |
|---|---|
| Time scale | Restart delay |

TABLE VII

Time Scale and Time Unit (TU) Definitions

| Time Unit | Time scale value |
|---|---|
| TU | 0 |
| 1000 TU | 1 |

The repeated measurements may be conducted n (=integer>=1) times 303 and may include a randomization interval 304. The repetition 303 of the same measurement multiple times increases the reliability of the results, while the randomization interval 104 allows freedom to the STA 102 to schedule its own measurement. Notably, the BS 101 may specify these parameters. For example, if the BS 101 specifies that the measurements are all to start at the same time, it could set the randomization interval 104 to zero.

In addition, the mode of the measurement may be transmitted in the BLM-REQ or single measurement request. An illustrative Request Mode is shown in Table VIII. The mode allows the BS 101 to indicate how it wants the measurement to be carried out and how the report from the STA 102 is to be sent back to the BS 101. For example, since the BS 101 may request multiple measurements to be conducted by the STA 102, the BS 101 may specify whether these measurements are to be carried out in parallel or not by setting the Parallel field indicated in Table VIII. As for the report sent from the STA 102 back to the BS 101, it may be either periodic (i.e., explicitly requested by the BS 101 at given times) or autonomous. This is indicated by the field Autonomous Report shown in Table VIII. Furthermore, the duration for a measurement can be mandatory or not as shown in Table VIII. In other words, the STA 102 may have to take measurements for an entire period requested by the BS 101 or for a shorter period. This freedom is indicated by the Duration Mandatory field in Table VIII.

TABLE VIII

Request Mode

| Syntax | Size | Notes |
|---|---|---|
| Request_Mode_Format( ) | | |
| Parallel | 1 bit | Indicates whether the measurement should start in series or in parallel with the measurement described by any immediately previous Measurement Request element in the same Measurement Request frame. A value of 0 shall mean that the measurement shall start after the previous measurement request has completed. A value of 1 shall mean the measurement shall start at the same time as the previous measurement. The Parallel bit shall be set to 0 in the first or only measurement request element in the frame. |
| Autonomous Report | 1 bit | Indicates whether the CPE receiving the request shall enable or disable autonomous measurement reports for the measurements specified in this request. The Report bit shall be set to 1 when enabling autonomous measurement report. The Report bit shall be set to 0 when disabling an autonomous measurement report. |
| Duration Mandatory | 1 bit | Indicates whether the measurement duration contained within the Measurement Request should be interpreted as mandatory by the CPE receiving the request. A value of 0 shall indicate that the duration requested is target duration, but the requesting BS shall accept measurement results taken over a shorter duration. A value of 1 shall indicate that the duration requested is a mandatory duration. |
| } | | |

Table IX is a message format for a signal-specific measurement request. Table X provides certain system profiles for certain in-band and out-of-band measurements. For example, the network 100 may be operating in a TV band, but may require data on nearby TV stations (i.e., ATSC, DVB, etc.). Thus, a signal specific measurement request with may be made using this field in the System Profile Field of Table IX.

The measurement data of the signal specific measurement data may be used for one of a variety of applications. In one illustration, the measurement data may be used to allow STAs 102 that are presently in the network 100 to move to the nearby network, which may provide greater bandwidth. In addition, the network 100 could move to another channel that provides better quality or that is free of the presence of both incumbents and other secondary users.

TABLE IX

Message format

| Syntax | Size | Notes |
|---|---|---|
| Signal_Specific_Measurement_Request_Format( ) | | |
| System Profile | 8 bits | See Table X |
| Randomization Interval | 16 bits | This field only applies to out-of-band measurements, as in-band measurements are driven by quiet periods. It specifies the upper bound of the random delay that can be used by the CPE prior to making the measurement. It is specified in units of TU (see Table). |
| Duration | 16 bits | Shall be set to the preferred duration of the requested measurement, expressed in TUs. |
| Threshold Valid | 1 bit | 0: Threshold value is not valid and shall be disregarded. 1: CPE shall use the Threshold value specified to the detect incumbents with the desired system profile. |

TABLE IX-continued

Message format

| Syntax | Size | Notes |
| --- | --- | --- |
| Threshold | 15 bits | Signed number which indicates the threshold (in dBm) to be used by CPEs for detecting incumbents. If Threshold Valid = 0, CPEs shall disregard this value and use the default (possibly preprogrammed) threshold for conducting this type of signal specific measurement. |

TABLE X

System Profiles

| System_Profile | Description |
| --- | --- |
| 0 | 802.22 |
| 1 | ATSC |
| 2 | NTSC |
| 3 | Wireless Microphone |
| 4 | DVB |
| 5-255 | Reserved |

Table XI illustrates a beacon measurement request message format. This is another type of in-band or out-of-band measurement that may be used to garner information of nearby networks based on beacon transmissions. As will be appreciated, measurements of beacon transmissions can be used in a variety of ways to improve QoS and to reduce interfering with incumbent devices. For example, if one or more STAs 102 garner a rather strong beacon signal, these data may be used to transfer the STAs 102 to the network associated with beacons. Alternatively, the network 100 may decide to establish communication with another network over the air, and engage in a negotiation to share channel usage for better spectrum utilization and interference mitigation.

TABLE XI

Beacon Measurement Request Message format

| Syntax | Size | Notes |
| --- | --- | --- |
| Beacon_Measurement_Request_Format( ) | | |
| Randomization Interval | 16 bits | This field only applies to out-of-band measurements, as in-band measurements are driven by quiet periods. It specifies the upper bound of the random delay that can be used by the CPE prior to making the measurement. It is specified in units of TU. |
| Duration | 16 bits | Shall be set to the preferred duration of the requested measurement, expressed in TUs. |
| ID | 48 bits | Specifies the ID (e.g., MAC ID) to listen to. Can be a broadcast ID or a specific station ID. |

Table XII is an example of a measurement stop request. The measurement termination request defines the point at which measurements by a particular STA 102 or group of STAs 102 are to terminate. This request may be made after the beacon period 202, or as part of the BLM-REQ. Table XIII is a Stop Time field in the message, and provides an absolute time at which present measurements are to terminate.

Measurement Stop Request

TABLE XII

Message format

| Syntax | Size | Notes |
| --- | --- | --- |
| Stop_Measurement_Request_Format( ) | | |
| Stop Time | 16 bits | Consists of an unsigned integer number representing the time at which the CPE shall stop conducting all measurements activities. The Stop Time field consists of a Time Scale subfield and a Stop Time subfield as shown in Table. The Time Scale subfield is defined in Table VII and represents the time units for the integer in the Stop Time subfield. |

TABLE XIII

Stop Time field

| Bits: 1 | 15 |
| --- | --- |
| Time Scale | Stop time |

The STAs 102 may be asked for data specific to the STA. These data may be used by the BS 101 or other STAs, or both, to track certain traits of the STAs 102. Table XIV includes a representative format for the CPE Statistics Measurement Request. The Group Identity Field is provided in Table XV. The information gathered can be of several types. For example, the number of packets transmitted by a STA 102, the number of packets received in error, the number of beacons detected by a STA, and etc. With this information, the BS 101 can, for example, determine that certain STA 102 are under heavy/low interference and take actions accordingly, such as changing transmit/receive schedules of one or more STAs 102.

CPE Statistics Measurement Request

TABLE XIV

Message format

| Syntax | Size | Notes |
| --- | --- | --- |
| CPE_Statistics_Measurement_Request_Format( ) | | |
| Group Identity | 8 bits | Table XV |
| Randomization Interval | 16 bits | This field only applies to out-of-band measurements, as in-band measurements are driven by quiet periods. |

TABLE XIV-continued

Message format

| Syntax | Size | Notes |
| --- | --- | --- |
| Duration | 16 bits | It specifies the upper bound of the random delay that can be used by the CPE prior to making the measurement. It is specified in units of TU (see Table). Shall be set to the preferred duration of the requested measurement, expressed in TUs. |
| } | | |

TABLE XV

Group Identity

| Statistics Name | Group Identity |
| --- | --- |
| CPE Counters from dot22CountersTable | 0 |
| Reserved | 1-255 |

The location of each STA 102 is useful in a variety of ways in the network. For example, if an STA 102 is comparatively far from the BS 101 or many of the other STAs, or both, its measurement data may be used to make adjustments for only this STA, and not the majority of STAs. Moreover, if an STA 102 were in the fringes of the range of the network, the decision may be made associate the STA with a nearby network. Also, the location can be used as input to clustering algorithms. These clustering algorithms could select which STAs 102 have to perform which measurement based on their locations. Thus, the BS 101 will likely need the location of each STA. Table XVI provides a message format and fields for the request.

Location Configuration Measurement Request

TABLE XVI

Message format

| Syntax | Size | Notes |
| --- | --- | --- |
| Location_Configuration_Measurement_Request_Format( ) | | |
| LCI Discovery Mode | 8 bits | Indicates the means by which the CPE should acquire its location information. 0 - CPE should infer its own location information from other CPEs/BSs. 1 - External ways can be used (e.g., GPS). |

TABLE XVI-continued

Message format

| Syntax | Size | Notes |
| --- | --- | --- |
| | | 2 - Either internal or external means can be used. 3-255 - Reserved |

2. Measurement Reports

After measurements are taken, or attempts thereof, the STAs 102 provide reports to one another, or to the BS 101, or both. These reports may be transmitted during the regular measurement reporting period(s) 203, or the urgent measurement reporting period(s) 204, or during the beacon period(s) 201, 207, in other communications, for example. The reports may be transmitted by the STAs 102 with a request for acknowledgement, and may be repeatedly transmitted until acknowledgement is received from the intended recipients. The report message formats track the request formats described above. Details that would be duplicative are omitted in order to avoid obscuring the presently described embodiments.

As alluded to previously, the nature of the reports received by the BS 101 can be essentially of two types: regular or urgent. Regular reports refer to the cases where the BS 101 has explicitly requested STAs 102 to report back with a certain periodicity (and so the BS 101 can allocate sufficient resources beforehand); and also when STAs are allowed to report autonomously. Illustratively, the STAs may report autonomously when sufficient data has been collected for a particular need. For example, the STAs 102 may have to request for resource allocation, and these data are required in support of that request.

Urgent reports from the STAs 102 to the BS 101 are provided when a catastrophic event may be imminent. For example, urgent reports are provided when an incumbent is detected in a channel in use by the network, or when the system QoS is compromised. In this case, the BS 101 provides regular upstream contention periods where STAs can notify the BS 101 about potential interference and any critical measurement results. Alternatively, the MAC protocol may support special fields in the MAC header frame that can be used by the CPE to notify the BS about an urgent situation.

Once the BS 101 analyses the reports from its various STAs, it may take steps to resolve any potential coexistence situation (either with incumbents or with other similar networks, also known as self-coexistence). To this end, the MAC should support a rich set of spectrum management messages (e.g., dynamic frequency selection and transmit power control) that enables the BS 101 to act promptly and effectively as to resolve the coexistence situation. In case of self-coexistence, another mechanism available is "interference-free" scheduling and traffic constraints. As is known, interference-free scheduling is the process by which the transmit/receive periods of STAs 102 are dynamically controlled with the goal of preventing interference among nearby STAs 102. For example, whenever STA A 102 is receiving from its BS 101, the interference-free scheduling mechanism would prevent that another nearby STA B 102 engages on transmission and hence compromises the reception from STA A 102.

Table XVII illustrates a representative format for a Bulk Measurement Report (BLM-REP). The Report includes a field indicating the number of Single Measurement Reports to be included. Table XXVIII illustrates a representative format for a Single Measurement report, which includes a Report Information Element (IE). Table XIX illustrates a representative format for Report IE. The BLM-REP thus includes the plurality of Single Measurement Reports, which in turn include Report IEs. The Report IEs usefully include the requested measurement data. These data may then be used to take needed action for spectrum management.

TABLE XVII

Bulk Measurement Report Message Format

| Syntax | Size | Notes |
|---|---|---|
| BLM-REP_Message_Format( ) | | |
| Management Message Type | 8 bits | |
| Transaction ID | 16 bits | |
| Number of Single Measurement Reports | 8 bits | The number of single measurement reports contained in this message |
| Single Measurement Reports | Variable | See Table XVIII |

TABLE XVIII

Message format

| Syntax | Size | Notes |
|---|---|---|
| Single_Measurement_Report_Format( ) | | |
| Element ID | 8 bits | |
| Length | 8 bits | |
| Transaction ID | 16 bits | |
| Report Information Element | Variable | Table XIX |

TABLE XIX

Report Information Elements

| Element ID (1 byte) | Length (bytes) | Description |
|---|---|---|
| 129 | Variable | TV Related Measurement Report |
| 130 | Variable | Wireless Microphone Related Measurement Report |
| 131 | Variable | Beacon (802.22 Related) Measurement Report |
| 132 | Variable | CPE Statistics Measurement Report |
| 133 | Variable | Location Configuration Measurement Report |
| 134-255 | | Reserved |

Table XX illustrates a representative format of a Signal Specific Measurement Report. As part of what can be specified by a STA 102 in this Report, the channel number and the value field represent, respectively, which channel was measured by the station and the power level (in terms of output SNR) that was detected in the corresponding channel. Alternatively, in certain embodiments, the secondary network 100 includes a Fast Fourier Transform (FFT) based modulation system (e.g., OFDM). In such an embodiment instead of returning the overall power level detected within the channel for a given measurement, the STAs 102 may return the power level detected in each bin of the FFT. That is, the STA 102 can return the entire FFT to the BS 101 or other STA 102. This would provide much finer-grained and detailed information of the spectrum occupancy in the given channel. Ultimately, the reporting in bins across a comparably large frequency range (e.g., 2000 bins over 6 MHz) allows for a greater representation of spectrum utilization.

TABLE XX

Message format

| Syntax | Size | Notes |
|---|---|---|
| Signal_Specific_Measurement_Report_Format( ) | | |
| System Profile | 8 bits | See Table |
| Report Mode | 4 bits | Table XXI |
| Start Frame | 8 bits | Frame number in which the channel measurement started |
| Duration | 16 bits | The duration of the measurement |
| Channel Number | 8 bits | |
| Value | 10 bits | The value (e.g., output SINR) of the measurement |
| Precision | 6 bits | Indicates the accuracy (significance) of the measured value |

TABLE XXI

Report mode

| Syntax | Size | Notes |
|---|---|---|
| Report_Mode_Format( ) | | |
| Late | 1 bit | Indicates whether this CPE is unable to carry out a measurement request because it received the request after the requested measurement time. The Late bit shall be set equal to 1 to indicate the request was too late. The Late bit shall be set to 0 to indicate the request was received in time for the measurement to be executed, or if no start time was specified. |
| Incapable | 1 bit | Indicates whether this CPE is incapable of generating this report requested by the BS. The Incapable bit shall be set to 1 to indicate the CPE is incapable. The Incapable bit shall be set to 0 to indicate the CPE is capable or the report is autonomous. |
| Refused | 1 bit | Indicates whether this CPE is refusing to generate this report requested by the BS. The Refused bit shall be set to 1 to indicate the CPE is refusing. The Refused bit shall be set to 0 to indicate the CPE is not refusing or the report is autonomous. |
| Unmeasured | 1 bit | CPE did not measure the channel |

As noted, beacon measurements provide information on both in-band and out-of-band wireless stations and networks within the transmission/reception range of one or more STAs 102 or the BS 101 of the network 100. A beacon measurement report, such as the example of Table XXII, is sent from the STAs 102 to its corresponding BS 101, and conveys information about overhead beacons (e.g., SCHs transmitted by other BSs) and/or coexistent beacons (transmitted by other STAs/BSs) originated at other collocated cells.

TABLE XXII

Message format

| Syntax | Size | Notes |
|---|---|---|
| Beacon_Measurement_Report_Format( ) | | |
| Element ID | 8 bits | |
| Length | 8 bits | |
| Report Mode | 4 bits | Table XXI |
| Start Frame | 16 bits | Table |
| Duration | 16 bits | Table |
| Channel Number | 8 bits | |
| Number of Channels | 8 bits | |
| FDC | 8 bits | The information regarding the frame duration code |
| FS | 7 bits | The number of frames per superframe |
| BS ID | 48 bits | ID/Address that uniquely identifies the BS |
| BS/CPE IEs | Variable | |

TABLE XXIII

BS IE

| Syntax | Size | Notes |
|---|---|---|
| BS_IE_Format( ) | | |
| Element ID | 8 bits | |
| Length | 8 bits | |
| RCPI | 8 bits | Received Carrier Power Indicator (in dBm) |
| Link Margin | 8 bits | In dBm |

TABLE XVIV

STA IE

| Syntax | Size | Notes |
|---|---|---|
| CPE_IE_Format( ) | | |
| Element ID | 8 bits | |
| Length | 8 bits | |
| Frame Number | 8 bits | The frame where the beacon was transmitted |
| Frame Offset | 16 bits | The offset, with respect to the start of the frame transmission, where the beacon was transmitted |
| CPE ID | 48 bits | Address/ID that uniquely identifies the CPE |
| RCPI | 8 bits | |
| Link Margin | 8 bits | |
| Beacon IEs | variable | A number of Beacon IEs (See Table XXV) |

TABLE XXV

Beacon IE

| Syntax | Size | Notes |
|---|---|---|
| CPE_Beacon_IE_Format( ) | | |
| Element ID | 8 bits | |
| Length | 8 bits | |
| Direction | 1 bit | Indicates whether this reservation is for Upstream direction (set to 0) or Downstream direction (set to 1) |
| Reserved | 4 bits | Reserved |
| Frame Offset | 16 bits | Indicates the offset (in units of symbol duration) of this CPE's reservation with the BS (whether DS or US) relative to the start of the first symbol of the PHY PDU (including preamble) where the frame is transmitted. The time instants indicated by the Frame Offset values are the transmission times of the first symbol of the CPE reservation including preamble (if present). |
| Duration | 16 bits | Indicates the duration (in units of symbol duration) of this CPE's reservation with the BS (whether DS or US) |
| CoS | 3 bits | Indicates the priority of the reservation |
| Channel Number | 8 bits | The channel initial number of this reservation |
| Number of Channels | 8 bits | The number of channels that this reservation spans |

TABLE XXVI

CPE Statistics Measurment Report Message format

| Syntax | Size | Notes |
|---|---|---|
| CPE_Statistics_Measurement_Report_Format( ) | | |
| Report Mode | 4 bits | Table |
| Start Frame | 16 bits | Frame number in which the channel measurement started |
| Duration | 16 bits | |
| Group Statistics Data | Variable | Table |

TABLE XXVII

Group Statistics Data

| Group Identity Requested | Statistics Returned (possibly stored in the MIB) (32 bits) |
|---|---|
| 0 | dot22TransmittedCoexistenceBeaconCount<br>dot22TransmittedFragmentCount<br>dot22TransmittedFrameCount<br>dot22MulticastTransmittedFrameCount<br>dot22FailedCount<br>dot22RetryCount<br>dot22MultipleRetryCount<br>dot22FrameDuplicateCount<br>dot22ReceivedFragmentCount<br>dot22ReceivedCoexistenceBeaconCount<br>dot22ReceivedBSBeaconCount<br>dot22MulticastReceivedFragmentCount<br>dot22CRCErrorCount |
| 1-255 | None |

A Location Configuration report, as described in the known IETF RFC 3825 ("Dynamic Host Configuration Protocol Option for Coordinate-based Location Configuration Information"), includes latitude, longitude and altitude. The report format may be as described in RFC 3825, and the length shall be 16 octets. An illustrative format for such a message is provided in Table XXVIII.

TABLE XXVIII

Message format

| Syntax | Size | Notes |
|---|---|---|
| Location_Configuration_Measurement_Report_Format( ) | | An LCI with Latitude resolution, Longitude resolution and Altitude resolution set to zero shall indicate that the location is not known. |
| Element ID | 8 bits | |
| Length | 8 bits | Shall be 16 octets |
| Report Mode | 4 bits | Table |
| Latitude Resolution | 6 bits | Latitude resolution indicates the number of valid bits in the fixed-point value of Latitude |
| Latitude | 34 bits | Latitude is a fixed point value consisting of 9 bits of integer and 25 bits of fraction |
| Longitude Resolution | 6 bits | Longitude resolution indicates the number of valid bits in the fixed-point value of Longitude |
| Longitude | 34 bits | Longitude is a fixed point value consisting of 9 bits of integer and 25 bits of fraction |
| Altitude Type | 4 bits | Altitude Type encodes the type of altitude. Codes defined are: 1: Meters - in 2s-complement fixed-point 22-bit integer part with 8-bit fraction; 2: Floors - in 2s-complement fixed-point 22-bit integer part with 8-bit fraction; Altitude type = 2 for Floors enables representing altitude in a form more relevant in buildings which have different floor-to-floor dimensions. |
| Altitude Resolution | 6 bits | Altitude resolution indicates the number of valid bits in the altitude |
| Altitude | 30 bits | Altitude is a value defined by the Altitude type field |
| Datum | 8 bits | Datum is encodes the horizontal and vertical references used for the coordinates. The Datum octet has 256 possibilities, of which 3 have been registered with the Internet Assigned Numbers Authority (IANA): 1: WGS 84 (Geographical 3D) - World Geodesic System 1984, Coordinate Reference System (CRS) Code 4327, Prime Meridian Name: Greenwich; 2: NAD83 - North American Datum 1983, CRS Code 4269, Prime Meridian Name: Greenwich; The associated vertical datum is the North American Vertical Datum of 1988 (NAVD88); 3: NAD83 - North American Datum 1983, CRS Code 4269, Prime Meridian Name: Greenwich; the associated vertical datum is Mean Lower Low Water (MLLW). The WGS 84 datum shall be used when referencing locations anywhere. The GeoConf Option referred to in IETF RFC 3825 defines two fields for which the IANA maintains a registry: The Altitude type (AT) field and the Datum field. The initial values of the Altitude registry are as follows: AT = 1 meters of Altitude defined by the vertical datum specified; AT = 2 building Floors of Altitude. |

Figure 4:
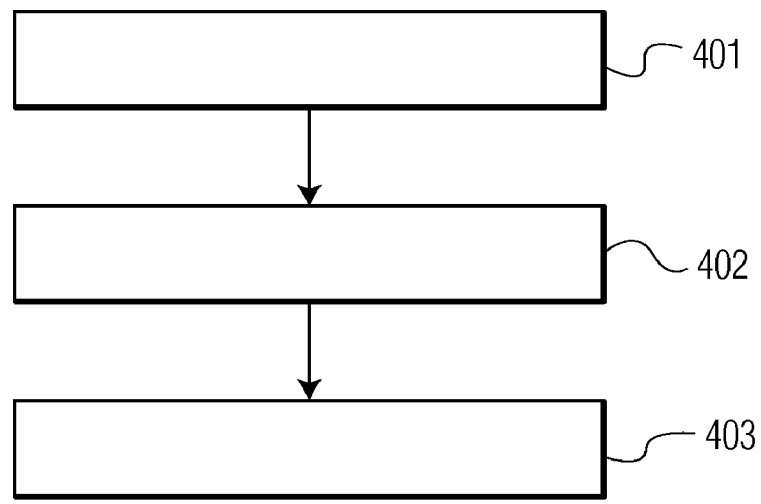
FIG. 4 is a simplified flow-chart of a method of wireless communication in accordance with an example embodiment.

FIG. 4 is a simplified flow-chart of a method of wireless communication in accordance with a representative embodiment. The method includes many details described in connection with illustrative embodiments. These details are not repeated to avoid obscuring the presently described method.

At step 401, measurement requests are transmitted. These requests may be from the BS 101 to the STAs 102, or between the STAs 102, depending on the type of MAC (centralized or distributed) layer utilized. After the requests are received, and at step 402 the measurements are taken. Finally, at step 403, the reports are provided, either as a regular report or as an urgent report as described more fully above.

In view of this disclosure it is noted that the various methods and devices described herein can be implemented in hardware and software. Further, the various methods and parameters are included by way of example only and not in any limiting sense. In view of this disclosure, those skilled in the art can implement the present teachings in determining their own techniques and needed equipment to effect these techniques, while remaining within the scope of the appended claims.

The invention claimed is:

1. In a wireless communication network, a method of wireless communication, comprising:
    transmitting a measurement request to one or more wireless stations (STAs) in the network;
    performing the measurements according to the measurement request; and
    reporting results of the measurements, wherein time is allocated for each of the STAs to perform the reporting, wherein at least one regular reporting interval and at least one urgent reporting interval are established in one or more superframes, and wherein during the urgent reporting interval one or more of the STAs provides a report, and based on the report zero or more of the STAs switch from a communication channel to another communication channel.

2. The method as claimed in claim 1, wherein the transmitting of the measurement request further comprises:
transmitting the request from an access point (AP) to the STAs, wherein the network is a centralized network.

3. The method as claimed in claim 1, wherein the transmitting of the measurement request further comprises transmitting the request from one or more STAs in the network to other STAs in the network, wherein the network is a distributed wireless network.

4. The method as claimed in claim 1, wherein the performing further comprises repeating the measurements before the reporting.

5. The method as claimed in claim 1, wherein the transmitting the measurement request further comprises transmitting at least one bulk measurement request (BLM-REQ).

6. The method as claimed in claim 5, wherein the bulk measurement request further comprises one or more single measurement requests.

7. The method as claimed in claim 1, wherein the transmitting the measurement request further comprises transmitting at least one signal specific measurement request.

8. The method as claimed in claim 5, further comprising, after the transmitting the BLM-REQ, transmitting at least one bulk measurement response (BLM-RSP).

9. The method as claimed in claim 1, wherein the reporting further comprises transmitting a bull measurement report (BLM-REP), which further comprises a single measurement report.

10. The method as claimed in claim 1, wherein the reporting further comprises providing one or more of: a signal specific measurement report; a beacon measurement report; a CPE statistics measurement report; a location configuration measurement report.

11. The method as claimed in claim 1, wherein the reporting further comprises transmitting a plurality of bins of fast fourier transform (FFT) data, wherein each bin includes data from a portion of a frequency range.

12. A wireless communication network, comprising:
an access point (AP) adapted to transmit a measurement request to one or more wireless stations (STAs) in the network, wherein the STAs are adapted to perform measurements according to the measurement request: and to report results of the measurements, wherein time is allocated for each of the STAs to perform the reporting, wherein at least one regular reporting interval and at least one urgent reporting interval are established in one or more superframes, and wherein during the urgent reporting interval one or more of the STAs provides a report, and based on the report zero or more of the STAs switch from a communication channel to another communication channel.

13. The wireless communication network as claimed in claim 12, wherein the measurement request includes a bulk measurement request (BLM-REQ).

14. The wireless communication network as claimed in claim 12, wherein the measurement request includes a single measurement request.

15. The wireless communication network as claimed in claim 12, wherein the reported results are one or more of: a signal specific measurement report; a beacon measurement report; a CPE statistics measurement report; a location configuration measurement report.

\* \* \* \* \*